US 6,275,467 B1

(12) United States Patent
Wang et al.

(10) Patent No.: US 6,275,467 B1
(45) Date of Patent: Aug. 14, 2001

(54) POSITIVE PRESSURE OPTICAL SLIDER HAVING TRAILING END SIDE PADS

(75) Inventors: Ling Wang, Eden Prairie; Aaron C. Swann, Minneapolis; Gregory S. Mowry, Burnsville; Lori G. Swanson, Bloomington, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/981,592

(22) PCT Filed: Oct. 28, 1997

(86) PCT No.: PCT/US97/19566

§ 371 Date: Jan. 2, 1998

§ 102(e) Date: Jan. 2, 1998

(87) PCT Pub. No.: WO99/05679

PCT Pub. Date: Feb. 4, 1999

Related U.S. Application Data
(60) Provisional application No. 60/053,486, filed on Jul. 23, 1997.

(51) Int. Cl.[7] .................................................. G11B 7/00
(52) U.S. Cl. .................. 369/300; 360/236.5; 360/237
(58) Field of Search ............................ 360/103, 236.5, 360/237; 369/300

(56) References Cited

U.S. PATENT DOCUMENTS

| | | | |
|---|---|---|---|
| 4,212,044 | 7/1980 | Plotto | 360/103 |
| 4,555,739 | 11/1985 | Le Van et al. | 360/103 |
| 4,633,450 | * 12/1986 | Gueugnon | 369/13 |
| 4,636,894 | 1/1987 | Mo | 360/103 |
| 4,646,180 | 2/1987 | Ohtsubo | 360/103 |

(List continued on next page.)

FOREIGN PATENT DOCUMENTS

| | | |
|---|---|---|
| 0 146 217 A1 | 6/1985 | (EP) . |
| 0 600 348 A2 | 6/1994 | (EP) . |
| 54-151425 | 11/1979 | (JP) . |
| 60-101781 A | 6/1985 | (JP) . |
| 60-242548 | 12/1985 | (JP) . |
| 61-160885 | 7/1986 | (JP) . |
| 62-279515 | 4/1987 | (JP) . |
| 62-110680 | 5/1987 | (JP) . |
| 63036895 | 2/1988 | (JP) . |
| 631866867 | 7/1988 | (JP) . |
| 1-211383 | 8/1989 | (JP) . |
| 1-245480 | 9/1989 | (JP) . |

(List continued on next page.)

OTHER PUBLICATIONS

"IBM H–2344–A4 Disc Drive", Xerographhic copy of photograph, Dec. 1993.
"Roll Insensitive Slider Design for Improved Disk File Reliability", Research Disclosure–25947, Nov. 1995.

Primary Examiner—David Davis
(74) Attorney, Agent, or Firm—Westman, Champlin & Kelly, P.A.

(57) ABSTRACT

A disc head slider (250,320) includes a slider body having a leading slider edge (40), a trailing slider edge (42) and a center line (48) extending from the leading slider edge (40) to the trailing slider edge (42). The slider body carries a recording head (56) along the center line (48). First and second longitudinal side rails (60,62) are positioned on the slider body and terminate prior to the trailing slider edge (42). A third longitudinal rail (63) is positioned between the first and second longitudinal side rails (60,62) and terminates prior to the head (56). A first raised side pad (252) is positioned between the first longitudinal side rail (60) and the trailing edge (42) and rearward of the head (56), relative to the leading slider edge (40). A second raised side pad (254) is positioned between the second longitudinal side rail (62) and the trailing edge (42) and rearward of the head (56), relative to the leading slider edge (40).

18 Claims, 10 Drawing Sheets

U.S. PATENT DOCUMENTS

| | | | |
|---|---|---|---|
| 4,673,996 | 6/1987 | White | 360/103 |
| 4,734,803 | 3/1988 | Nishihira | 360/103 |
| 4,757,402 | 7/1988 | Mo | 360/103 |
| 4,870,519 | 9/1989 | White | 360/103 |
| 4,894,740 | 1/1990 | Chhabra et al. | 360/103 |
| 5,062,017 | 10/1991 | Strom et al. | 360/103 |
| 5,105,408 | 4/1992 | Lee et al. | 369/44.15 |
| 5,124,961 | 6/1992 | Yamaguchi et al. | 369/13 |
| 5,197,050 | 3/1993 | Murakami et al. | 369/13 |
| 5,200,868 | 4/1993 | Chapin et al. | 360/103 |
| 5,212,608 | 5/1993 | Yoneoka | 360/103 |
| 5,267,104 | 11/1993 | Albrecht et al. | 360/97.02 |
| 5,267,109 | 11/1993 | Chapin et al. | 360/103 |
| 5,274,518 | 12/1993 | Chapin et al. | 360/103 |
| 5,287,235 | 2/1994 | Cunningham et al. | 360/103 |
| 5,299,079 | 3/1994 | Kuroda | 360/103 |
| 5,343,343 | 8/1994 | Chapin | 360/103 |
| 5,353,180 | 10/1994 | Murray | 360/103 |
| 5,359,480 | 10/1994 | Nepela et al. | 360/103 |
| 5,396,386 | 3/1995 | Bolasna et al. | 360/103 |
| 5,396,387 | 3/1995 | Murray | 360/103 |
| 5,404,256 | 4/1995 | White | 360/103 |
| 5,406,432 | 4/1995 | Murray | 360/103 |
| 5,424,888 | 6/1995 | Hendriks et al. | 360/103 |
| 5,430,591 | 7/1995 | Takeuchi et al. | 360/103 |
| 5,473,485 | 12/1995 | Leung et al. | 360/103 |
| 5,488,524 | 1/1996 | Cunningham | 360/103 |
| 5,490,025 | 2/1996 | Dorius et al. | 360/103 |
| 5,490,026 | 2/1996 | Dorius et al. | 360/103 |
| 5,490,027 | 2/1996 | Hamilton et al. | 360/103 |
| 5,497,359 | 3/1996 | Mamin et al. | 369/44.15 |
| 5,499,149 | 3/1996 | Dovek | 360/103 |
| 5,513,056 | 4/1996 | Kawasaki et al. | 360/103 |
| 5,515,219 | 5/1996 | Ihrke et al. | 360/103 |
| 5,550,692 | 8/1996 | Crane | 360/103 |
| 5,550,693 | 8/1996 | Hendriks et al. | 360/103 |
| 5,625,513 | 4/1997 | Utsunomiya et al. | 360/103 |
| 5,677,812 | 10/1997 | Cha | 360/103 |
| 5,721,650 | 2/1998 | Crane et al. | 360/103 |

FOREIGN PATENT DOCUMENTS

| | | |
|---|---|---|
| 2-49281 | 2/1990 | (JP). |
| 2-53256 | 2/1990 | (JP). |
| 3-12854 | 1/1991 | (JP). |
| WO 91/06397 | 5/1991 | (JP). |
| 03251337 | 9/1991 | (JP). |
| 4-23283 | 1/1992 | (JP). |
| 04126472 | 5/1992 | (JP). |
| 5-28685 | 2/1993 | (JP). |
| 6-275038 | 9/1994 | (JP). |
| 07057517 | 3/1995 | (JP). |
| 8-279133 * | 10/1996 | (JP). |

* cited by examiner

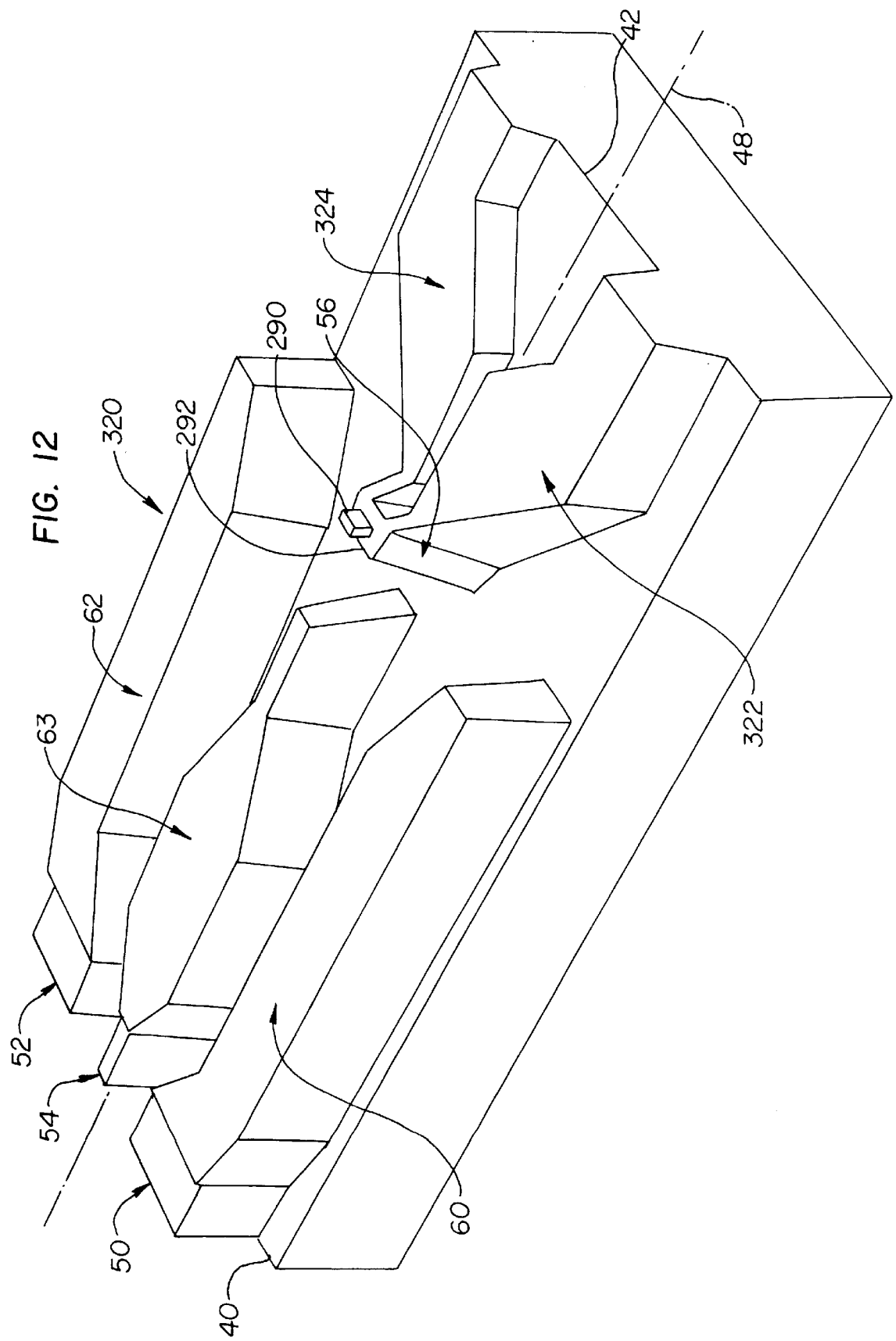

POSITIVE PRESSURE OPTICAL SLIDER HAVING TRAILING END SIDE PADS

This application is A371 of PCT/US/97/19566 filed Oct. 28, 1997 and claims benefit to Provisional application No. 60/053,486 filed Jul. 23, 1997.

BACKGROUND OF THE INVENTION

The present invention relates to disc drive storage systems and, more particularly, to a positive pressure slider having trailing end side pads for slow disc speed and high flying height applications, such as optical disc drive storage systems.

In optical disc drive storage systems, data is accessed by focusing a laser beam onto the data surface of a rigid disc and detecting light reflected from or transmitted through the data surface. In general, data is stored in the form of physical or magnetic marks carried on the surface of the dist which are detected using the reflected laser light. There are a number of different optical disc technologies which are known in the industry. For example, CD-ROMs are currently used to store digital data such as computer programs or digitized music. Typically, CD-ROMs are permanently recorded during manufacture. Another type of optical system is write-once read-many (WORM) systems in which a user may permanently write information onto a blank disc. It is also desirable to provide a system which is erasable, such as phase change and magneto-optic (M-O) systems. Phase change systems detect data by sensing a change in reflectivity. M-O systems detect data by measuring the rotation of the incident light polarization due to the magnetic orientation of the storage medium.

High density optical recording, particularly near-field recording (i.e., M-O or phase change systems), typically requires an optical head gimbal assembly (OHGA) having a slider for carrying an optical element over the data surface of the optical media. U.S. Pat. No. 5,497,359, issued Mar. 5, 1996, entitled "OPTICAL DISC DATA STORAGE SYSTEM WITH RADIATION-TRANSPARENT AIR-BEARING SLIDER" shows an example of a slider for use with an optical disc drive storage system.

In order to write a magnetic bit of information onto the disc surface, the disc surface is optically heated. With M-O media, for example, the laser beam is directed through an optical aperture in the slider, which heats the disc surface to a point above the Curie temperature of the medium. A magnetic coil carried on the slider is energized and the laser is turned off. As the medium cools below the Curie temperature, the heated spot is left with a desired magnetic orientation.

An actuator mechanism moves the slider from track to track across the surface of the disc under the control of electronic circuitry. The actuator mechanism includes a track accessing arm and a suspension for each optical head gimbal assembly. The suspension includes a load beam and a gimbal. The load beam provides a preload force which forces the slider toward the disc surface. The gimbal is positioned between the slider and the load beam to provide a resilient connection that allows the slider to pitch and roll while following the topography of the disc. The slider has an air bearing surface which faces, the disc surface.

There are generally two types of sliders used in the disc drive industry, positive pressure air bearing (PPAB) sliders and self-loading or "negative pressure" air bearing (NPAB) sliders. An NPAB slider typically has a pair of rails extending along the sides of the bearing, with a cavity dam or cross bar extending between the rails near the leading end of the slider. As the disc rotates, the surface of the disc drags air under the cavity dam by viscous friction. As the air passes over the cavity dam, the air expands into a "cavity" between the rails, which forms a partial vacuum in the cavity. The partial vacuum draws the slider closer to the disc surface and counteracts positive pressure developed along the rails. The cavity is open to atmospheric pressure at the trailing end of the slider, and may also include a center rail or an island at the trailing end of the slider to mount a single recording head. NPAB surfaces have many advantages, such as reduced take off and landing velocity during spindle start up and shut down, high bearing stiffness and lower sensitivity of flying height to changes in altitude and velocity, as compared to PPAB sliders having no cavity dam.

However, NPAB sliders are seldom used in ramp "load-unload" drive applications because of their high suction force. In these applications, the slider is unloaded from the disc surface by rotating the actuator mechanism until the suspension engages a ramp which lifts the suspension and thus the slider from the disc surface. The high suction force prevents an NPAB slider from following the suspension as the suspension rides up on the unloading ramp. The slider remains in close proximity to the spinning disc, and the ramp elastically deforms the suspension. The NPAB suction force breaks only when a significant elastic strain has accumulated in the suspension. The release of the suction force releases the elastic strain in the suspension and allows the slider to unload from the disc surface. This cycle of suction force and strain release occurs very rapidly relative to the time in which the suspension is in contact with the unloading ramp. The rapid release of elastic strain energy sets up vibratory oscillations in the slider position coordinate that is normal to the plane of the disc surface. These oscillations may be large enough to cause the slider to "slap" against the disc surface, thereby generating wear debris particles and possibly damaging the recording head.

Another problem observed with NPAB sliders during unloading occurs in the event that the unloading force exerted by the deformed suspension is too small to overcome the suction force. In this event, the suction force is broken when the slider is swung over the disc perimeter, allowing the atmosphere to flow into the cavity between the side rails with very little resistance. As the slider passes over the disc perimeter, pressurization between the side rails becomes unbalanced, causing the slider to roll to one side. As a result, the slider may contact the disc perimeter when unloading. Repetition of such contact causes wear on the slider and generates debris particles.

In contrast, PPAB sliders have a low suction force, making them more applicable for ramp load-unload drive applications than NPAB sliders. Although the side rails in a PPAB slider are not connected by a cavity dam, some air expansion typically occurs as the air is dragged under slider, if the slider has side rails with wide leading ends that transition to narrow sections near the middle of the slider. The suction force due to these expansions is somewhat smaller than that obtained with the expansion over a cavity dam in an NPAB slider, which allows PPAB sliders to be used more effectively in ramp load-unload applications. A commonly encountered problem in PPAB sliders is that the flying height is much higher at the disc outer diameter (OD) than at the disc inner diameter (ID). This can cause a reduction in the overall recording density achieved by the disc drive. Another problem encountered in PPAB sliders is that the air bearing pitch angle is typically too large, such as greater than 300 microradians. This is particularly true for applications having a low disc speed and a relatively high flying height, such as in optical disc drive storage systems.

SUMMARY OF THE INVENTION

The disc head slider of the present invention includes a slider body having a leading slider edge, a trailing slider edge and a center line extending from the leading slider edge to the trailing slider edge. The slider body carries a recording head along the center line. First and second longitudinal side rails are positioned on the slider body and terminate prior to the trailing slider edge. A third longitudinal rail is positioned between the first and second longitudinal side rails and terminates prior to the head. A first raised side pad is positioned between the first longitudinal side rail and the trailing edge and rearward of the head, relative to the leading slider edge. A second raised side pad is positioned between the second longitudinal side rail and the trailing edge and rearward of the head, relative to the leading slider edge.

BRIEF DESCRIPTION OF THE DRAWINGS

FIG. 12 is a perspective view of an optical recording slider according to another alternative embodiment of the present invention.

DETAILED DESCRIPTION OF THE PREFERRED EMBODIMENTS

Figure 1:
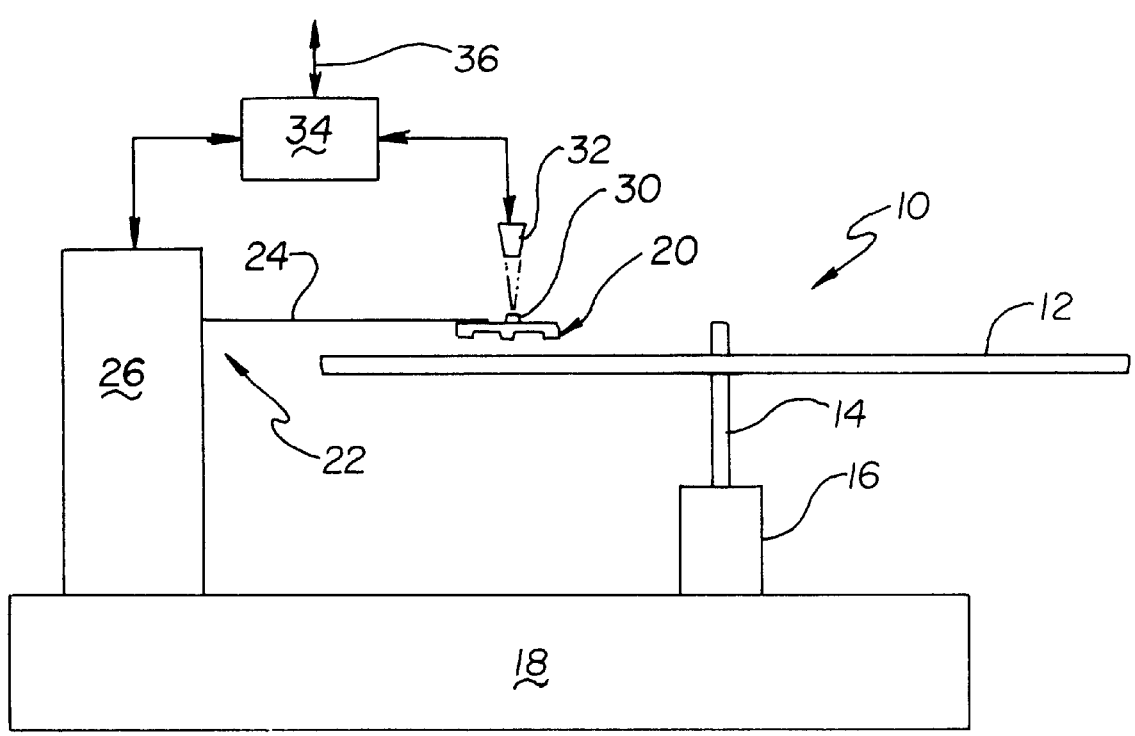
FIG. 1 is a simplified illustration of an optical recording system employing a slider according to the present invention.

FIG. 1 is a simplified illustration of an optical recording system 10 employing a slider in accordance with the present invention. System 10 includes optical disc 12 having a data surface which carries optically encoded information. Disc 12 rotates about spindle 14 and is driven by a spindle motor 16 which is mounted on base 18. A slider 20 is positioned proximate disc 12 and is coupled to an actuator 22. Actuator 22 includes armature 24 and actuator motor 26. Actuator motor is coupled to base 18. Slider 20 includes an optical aperture 30 which is spaced from an optical source/sensor apparatus 32. A controller 34 is electrically coupled to apparatus 32, actuator 26 and data bus 36 and is used for controlling operation of system 10.

During operation, spindle motor 16 rotates disc 12, and actuator 22 positions slider 20 radially over the data surface of disc 12. Controller 34 controls the position of slider 20, whereby information may be read from or written to disc 12 using optical source/sensor apparatus 32. This information may be received or transmitted on data bus 36.

Figure 2:
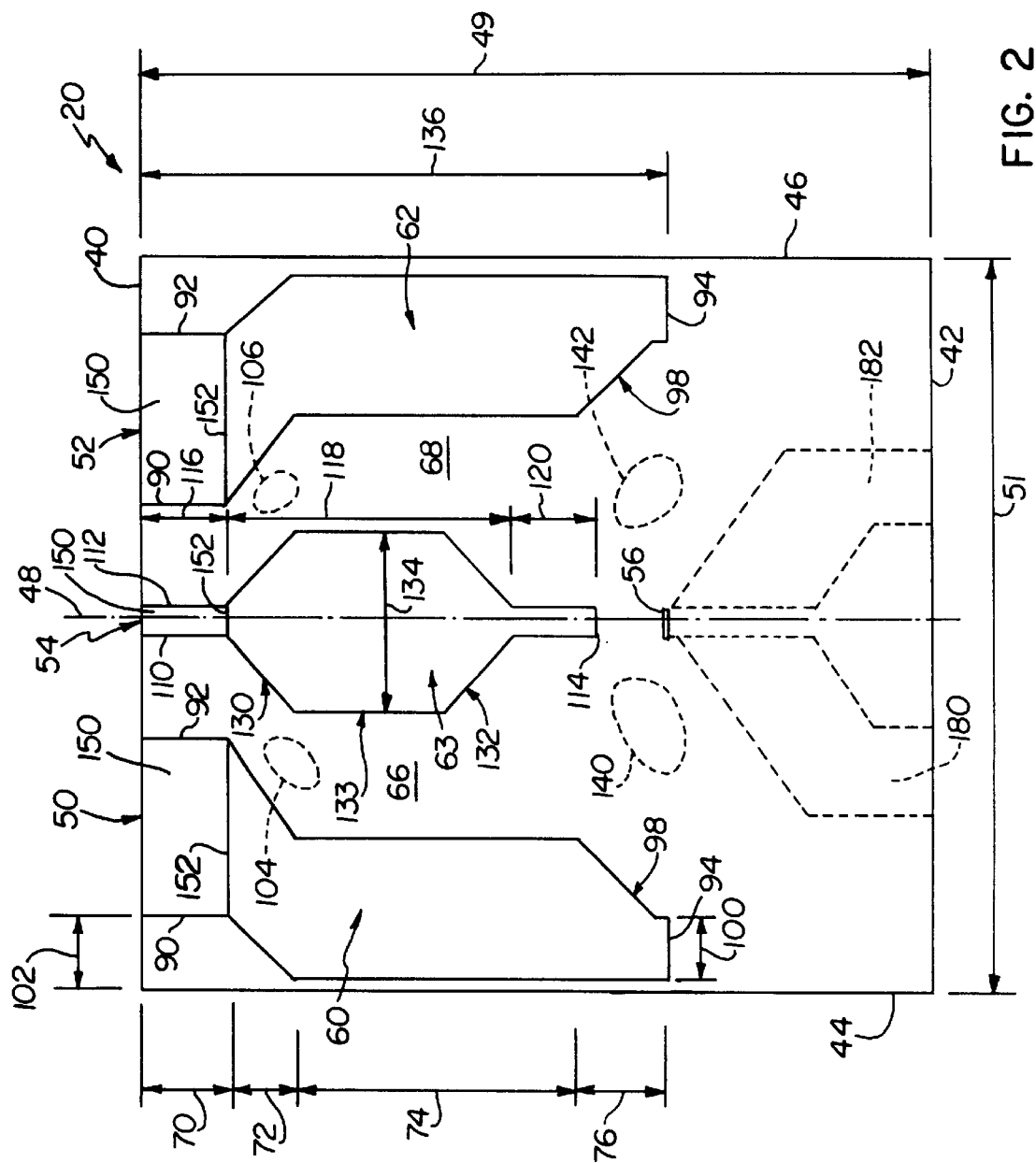
FIG. 2 is a plan view of the slider shown in FIG. 1 according to one embodiment of the present invention.

FIG. 2 is a plan view of slider 20 according to one embodiment of the present invention. Slider 20 includes leading slider edge 40, trailing slider edge 42, side edges 44 and 46, center line 48, length 49 and width 51. Length 49 is measured from leading slider edge 40 to trailing slider edge 42, and width 51 is measured from side edge 44 to side edge 46. In one embodiment, slider 20 is a "70-series" slider, in which length 49 is about 4.00 mm and width 51 is about 2.20 mm. However, in other embodiments, slider 20 can have other sizes, such as the size of a "50-series" slider in which length 49 is about 2.00 mm and width 51 is about 1.60 mm or a "30-series" slider in which length 49 is about 1.25 mm and width 51 is about 1.0 mm.

Slider 20 further includes side rails 50 and 52, center rail 54 and optical head 56. Side rails 50 and 52 are positioned along side edges 44 and 46, respectively. Side rails 50 and 52 extend from leading slider edge 40 and terminate prior to trailing slider edge 42. In the embodiment shown in FIG. 2, side rails 50 and 52 terminate at a position along length 49 that substantially corresponds to the position of optical head 56. Center rail 54 is positioned along center line 48, between side rails 50 and 52. Center rail 54 extends from leading slider edge 40 and terminates prior to optical head 56 and the trailing edges of side rails 50 and 52. Side rails 50 and 52 and center rail 54 form air bearing surfaces 60, 62 and 63, respectively. Optical head 56 is aligned with center line 48 and is positioned between center rail 54 and trailing slider edge 42.

Slider 20 further includes recessed areas 66 and 68 which extend from leading slider edge 40 to trailing slider edge 42 and are positioned between center rail 54 and side rails 60 and 62, respectively. In one embodiment, recessed areas 66 and 68 are recessed from air bearing surfaces 60 and 62 by approximately 11.5 microns. Other depths can also be used.

Side rails 50 and 52 each include a leading section 70, a leg section 72, a waist section 74, a trailing section 76, an outside rail edge 90, an inside rail edge 92 and a trailing rail edge 94. Outside and inside rail edges 90 and 92 extend parallel to center line 48 along leading section 70, from leading slider edge 40 to leg section 72. Outside and inside rail edges 90 and 92 diverge from center line 48 along leg section 72, from leading section 70 to waist section 74. Outside and inside rail edges 90 and 92 extend parallel to center line 48 along waist section 74. Outside rail edge 90 extends parallel to center line 48 along trailing section 76, while inside rail edge 92 diverges from center line 48 along trailing section 76. Side rails 50 and 52 have a minimum rail width 100 at trailing rail edge 94. The divergence of inside rail edges 92 along trailing sections 76 forms a notch 98 at the trailing edge of each side rail.

With this geometry, leg sections 72 of side rails 50 and 52 angle toward center line 48 as they extend forward from waist section 74 to leading section 70. This causes leading sections 70 to have an offset 102 toward center line 48. By offsetting leading sections 70, the disc tangential velocity intersects the outside edges of leg sections 72 at an angle when slider 20 is positioned at the middle diameter (MD) of the disc. This "angled leading rail" configuration results in a reduction of the flying height at the disc MD, which improves the recording density on the middle data tracks.

The middle diameter flying height (MDFH) is commonly quantified relative to the inner diameter flying height (IDFH) and the outer diameter flying height (ODFH) by an "MD humps" parameter, where:

$$MD\ hump=MDFH-[(IDFH+ODFH)/2]$$

The MD hump reflects a deviation of the middle diameter flying height from an ideal straight-line flying height profile between the inner diameter flying height and the outer diameter flying height. Reduction of the MD flying height therefore reduces the MD hump.

Notches 98 formed in side rails 50 and 52 counteract an increase in flying height at the disc OD caused by a higher disc tangential velocity at the disc OD. Notches 98 narrow the width of rails 50 and 52 to the minimum width 100 along trailing edge 94. The lift force on trailing sections 76 is equal to the pressure along the trailing sections times the area of the trailing sections. By cutting trailing sections 76 along notches 98, the lift force on trailing sections 76 decreases, resulting in a lower flying height at the disc OD.

Center rail 54 has lateral rail edges 110 and 112, a trailing rail edge 114, a narrow leading section 116, a wide waist section 118 and a narrow trailing section 120. Waist section 118 has transition sections 130 and 132 and a mid portion 133. Lateral rail edges 110 and 112 extend parallel to center line 48 along leading section 116 and then diverge from center line 48 along transition section 130 to a maximum rail width 134 at mid portion 133 of waist section 118. Lateral rail edges 110 and 112 extend parallel to center line 48 along mid portion 133 and then converge toward center line 48 along transition section 132. Lateral rail edges 110 and 112 extend parallel to center line 48 along trailing section 120.

In one embodiment, the maximum width 134 of center rail 54 is greater than the maximum rail width of side rails 50 and 52. Maximum width 134 is preferably located at a position along center line 48 corresponding to a midpoint along a length 136 of side rails 50 and 52. This provides increased lift at the center of the air bearing surfaces. Also, maximum rail width 134 is preferably confined to a range along center line 48 that corresponds to ⅓ and ⅔ of the length 136, as measured from leading slider edge 40.

The narrow, rectangular leading section 116 produces a relatively low suction force at the disc OD by providing a low air expansion ratio from leading edge 40 to waist section 118, which further improves the ramp unloading performance of slider 20 at the disc OD. In addition, the wide waist section 118 increases the flying height at the disc ID while at the same time reduces the flying height at the disc OD, which results in a lower ID-to-OD rise. The wide waist section 118 increases the flying height at the disc ID by increasing the lift force developed on the waist section. The lift force equals the positive pressure per unit area developed on the bearing surface times the area of the air bearing surface. Since the area of the air bearing surface is increased at the waist section, the total positive pressure developed on the waist section increases which increases the lift force. A higher lift force results in a higher flying height at the disc ID.

At the disc OD, the wide waist section 118 of center rail 54 generates higher positive pressure toward the front of center rail 54, as discussed above. However, narrowing center rail 54 along transition section 132 and trailing section 120 creates air expansion or subambient pressure regions 140 and 142 adjacent optical head 56 within recessed areas 66 and 68. Air expansion within regions 140 and 142 is further increased by notches 98 in side rails 50 and 52. This results in a higher suction force behind center rail 54 at the disc OD. A high lift force at the front end of center rail 54 lifts the leading portion of slider 20 while a high suction force at the trailing end of center rail 54 sucks the trailing portion of slider 20 down toward the disc surface, which increases the pitch angle of slider 20 at the disc OD. Since optical head 56 is located behind center rail 54, the flying height at the disc OD of optical head 56 decreases.

A relatively shallow leading step surface 150 is formed at the leading edge of side rails 50 and 52 and center rail 54. Each leading step surface 150 extends along the leading section of the rail, from leading slider edge 40 to a substantially vertical face 152. Face 152 extends from leading step surface 150 to the respective air bearing surface of the rail. Each leading step surface 150 is recessed from and parallel to the air bearing surfaces for easing pressurization of air bearing surfaces 60, 62 and 63.

The air bearing surface features of slider 20 can be formed by ion milling, chemical etching or Reactive Ion Etching (RIE), for example, with one or more masking and etching iterations. Forming leading step surfaces 150 by ion milling, chemical etching or Reactive Ion Etching reduces the sensitivity of the slider's flying characteristics to manufacturing tolerances as compared to similar tapered surfaces which are typically formed by less accurate lapping processes.

Figure 3:
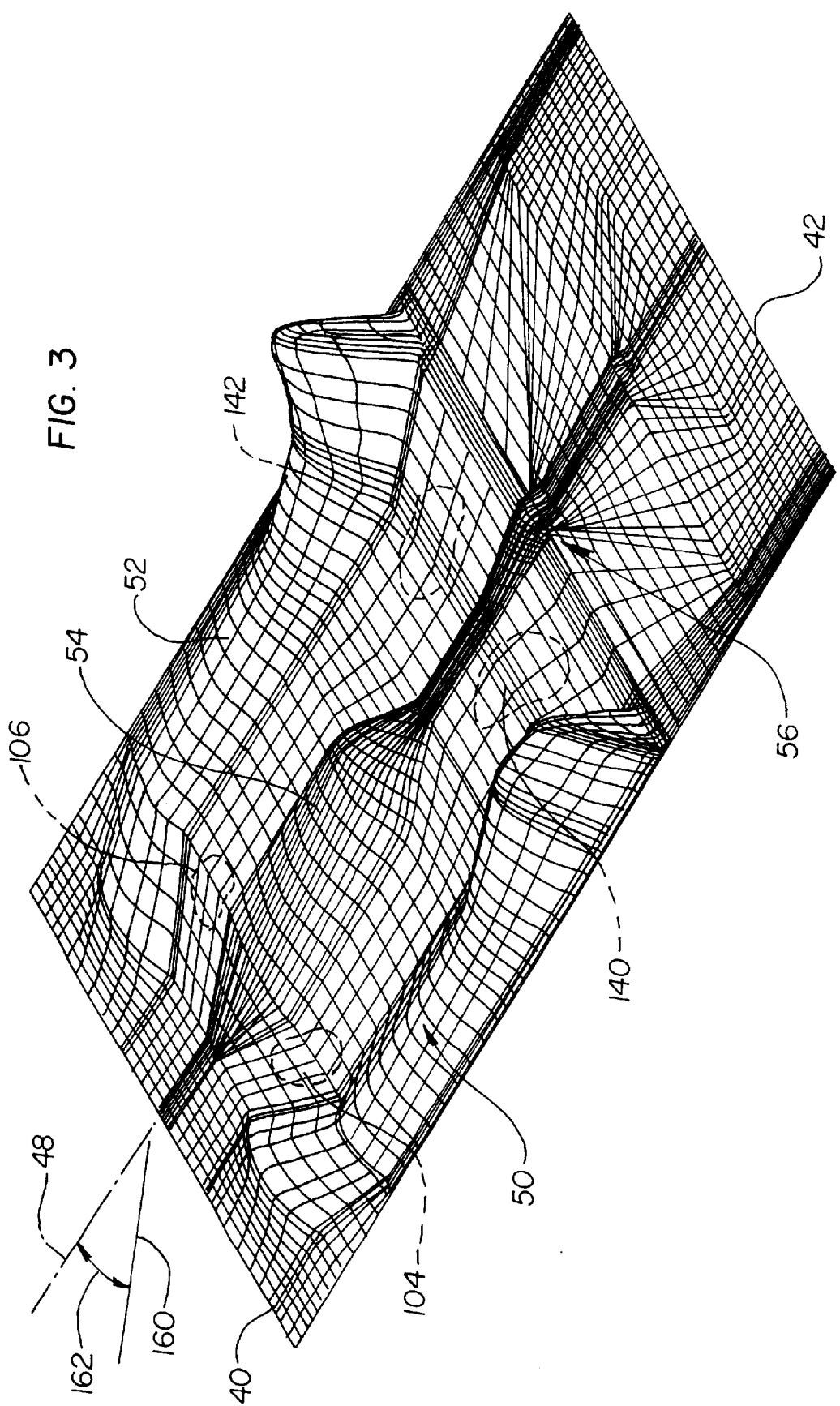
FIG. 3 is a computer-generated simulation of a pressure profile developed by the slider shown in FIG. 2 at the disc OD.

FIG. 3 is a graph illustrating a computer-generated simulation of the pressure developed on slider 20 at the disc OD. The locations of the side rails and the center rail are represented by arrows 50, 52 and 54, respectively. The location of the optical head is represented by arrow 56. Lines indicating above ambient pressure are oriented out of the page while lines indicating below ambient pressure are oriented into the page. At the disc OD, air flow 160 is orientated at an angle 162 with respect to slider center line 48. As the air is dragged beneath slider 20, the air compresses along side rails 50 and 52 and center rail 54, which develops positive pressure on side rails 50 and 52 and center rail 54. Air expansion in regions 104, 106, 140 and 142 develops areas of subambient pressure.

Figure 4:
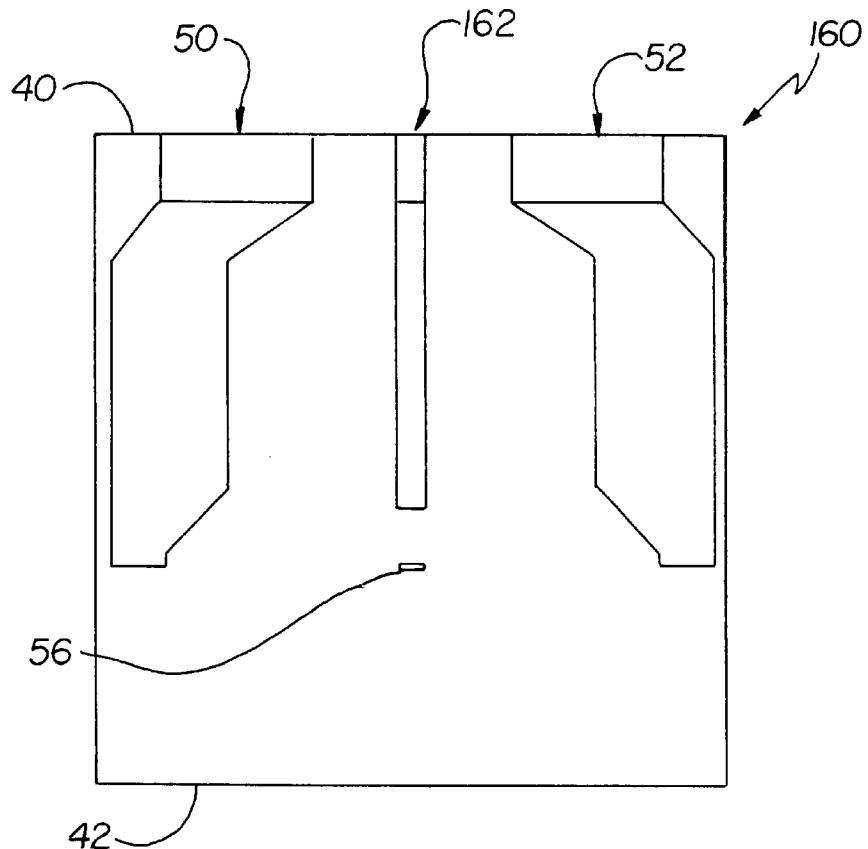
FIG. 4 is a plan view of a slider having a center rail with a narrow waist section as opposed to a wide waist section as in the slider shown in FIG. 2.

FIG. 4 is a plan view of a slider having a thin, rectangular center rail, as opposed to a wide center rail. The same reference numerals are used in FIG. 4 as were used in FIG. 2 for the same or similar elements. Slider 160 has a leading edge 40, a trailing edge 42, side rails 50 and 52, center rail 162 and optical head 56. Center rail 162 has the same length as center rail 54 shown in FIG. 2 but does not have a wide waist section. Rather, the waist section of center rail 162 is relatively narrow.

Figure 5:
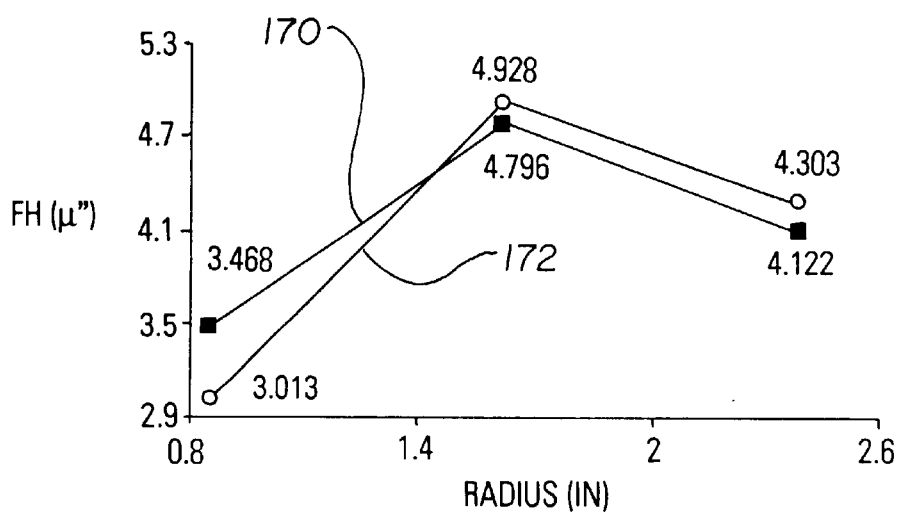
FIG. 5 is a graph comparing the flying height profiles of the sliders shown in FIGS. 2 and 4.

FIG. 5 is a graph illustrating the results of a flying height comparison of the sliders shown in FIGS. 2 and 4. The flying height in microinches is plotted as a function of the disc radius in inches. Line 170 represents the flying height of slider 20. Line 172 represents the flying height of slider 160. Application of the wide center rail on slider 20 reduced the ID-to-OD rise by 50 percent as compared to the ID-to-OD rise of slider 160. Also, the flying height of slider 20 is maintained significantly higher at the disc ID than slider 160. These characteristics are particularly useful in large disc drive applications having a relatively low disc rotational velocity and a high target flying height, such as in optical disc drive storage systems.

Referring back to FIG. 2, optical head 56 optically couples optical source/sensor apparatus 32 (shown in FIG. 1) to the surface of disc 12. In one embodiment, the optical aperture includes a solid immersion lens (SIL) which is formed by an objective lens, a cap lens and a MESA. A plurality of conductors (not shown) are coiled around the MESA for providing an electromagnetic field. Conductive traces 180 and 182 (shown in phantom) are applied to the floor of recessed areas 66 and 68 for providing Current to the coils surrounding the MESA.

To write data on a magneto-optic (M-O) disc, optical source/sensor apparatus 32 directs a laser beam through the SIL-type lens in optical head 56 to heat a small spot on the disc surface to a temperature above the Curie temperature of the magnetic medium. The coil surrounding the MESA is energized and the laser is turned off. As the magnetic medium cools below the Curie point, the heated spot is left with the desired magnetic orientation. Data is read from the M-O disc by reflecting the laser beam off of the disc surface and measuring the rotation of the polarization of the reflected beam.

Figure 6:
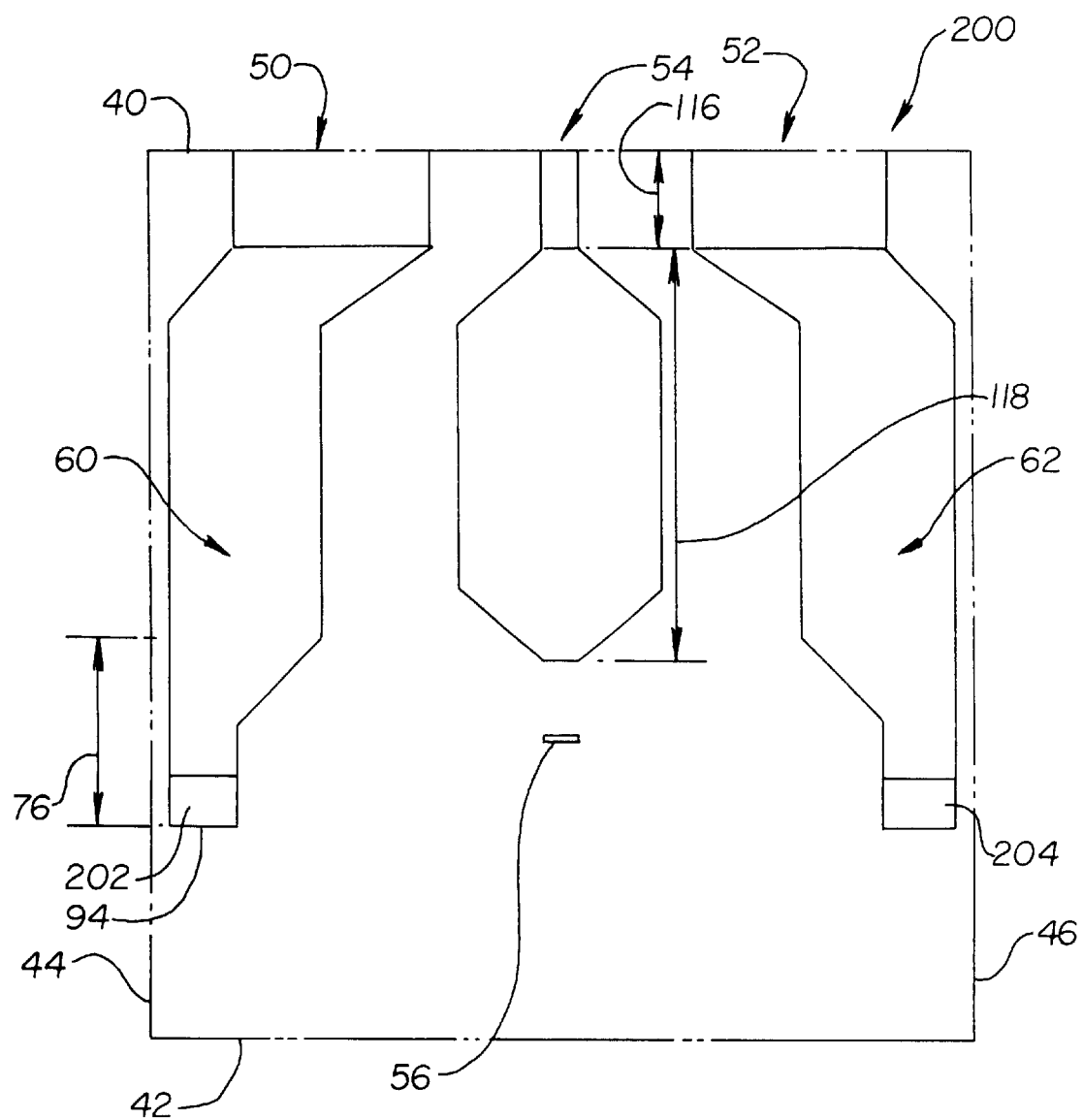
FIG. 6 is a plan view of a slider according to an alternative embodiment of the present invention.

FIG. 6 is a plan view of an optical recording slider according to an alternative embodiment of the present invention. The same reference numerals are used in FIG. 6 as were used in FIG. 2 for the same or similar elements. Slider 200 includes leading slider edge 40, trailing slider edge 42, side edges 44 and 46, side rails 50 and 52, center rail 54 and optical head 56. In this embodiment, waist section 118 of center rail 54 is lengthened toward optical head 56, and the rectangular trailing section 120 (show in FIG. 2) is removed. Also, trailing sections 76 of side rails 50 and 52 extend beyond optical head 56 along the length of slider 200. In addition, stepped trailing surface 202 and 204 have been added to trailing section 76 of side rails 50 and 52, respectively, at trailing rail edge 94. Trailing step surfaces 202 and 204 are recessed from and substantially parallel to air bearing surfaces 60 and 62 of side rails 50 and 52. Trailing step surfaces 202 and 204 increase pitch stiffness while keeping the lowest flying point of slider 200 as high as possible.

Figure 7:
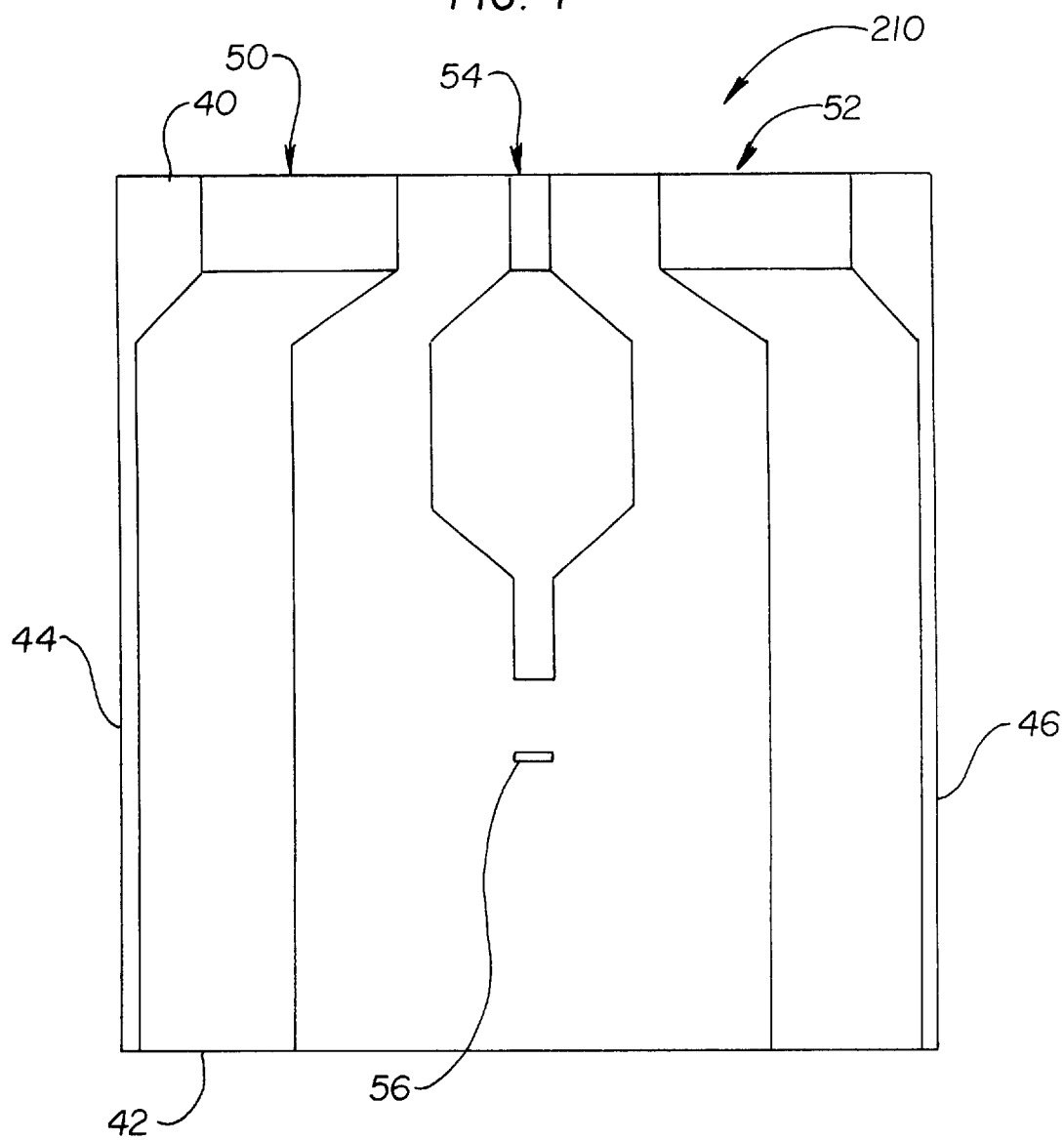
FIG. 7 is a plan view of a slider according to another alternative embodiment of the present invention.

FIG. 7 is a top plan view of an optical recording slider according to another alternative embodiment of the present invention. Again, the same reference numerals are used in FIG. 7 as were used in FIG. 2 for the same or similar elements. In FIG. 7, side rails 50 and 52 extend all the way to trailing slider edge 42.

Figure 8:
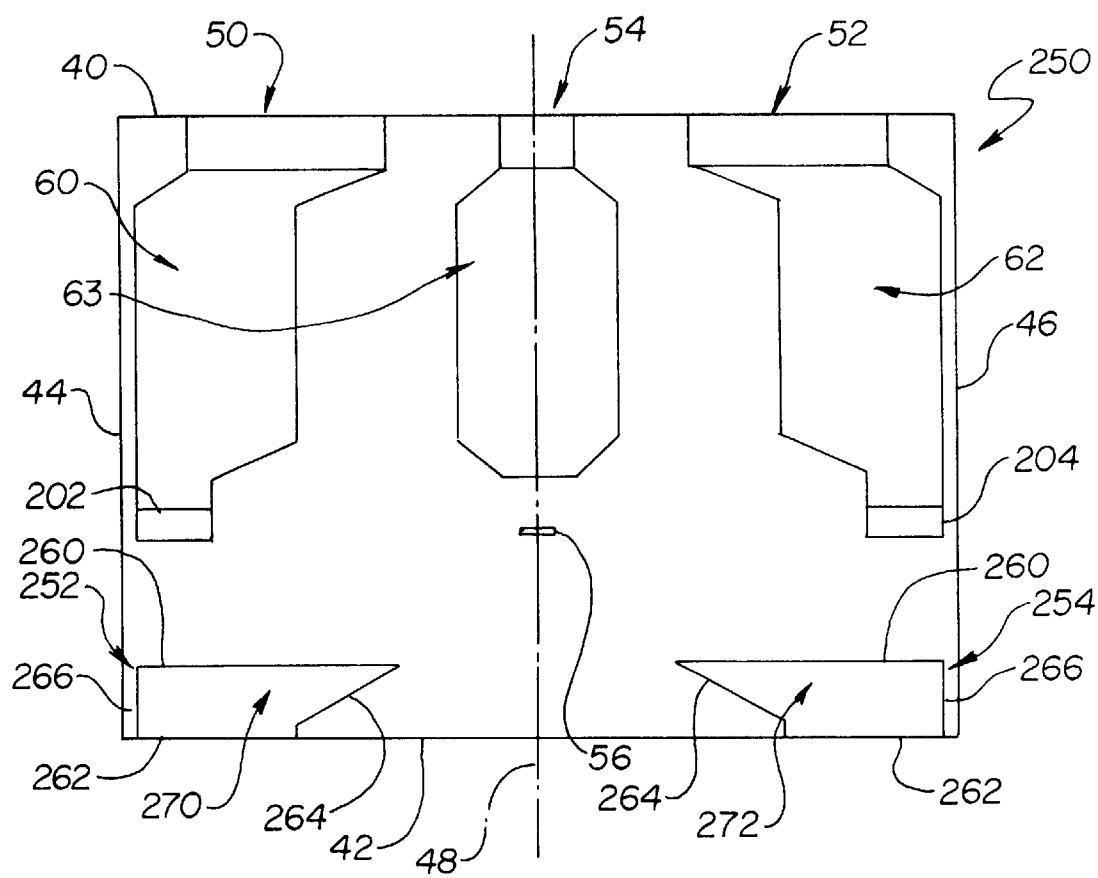
FIG. 8 is a plan view of an optical recording slider according to another embodiment of the present invention.
Figure 9:
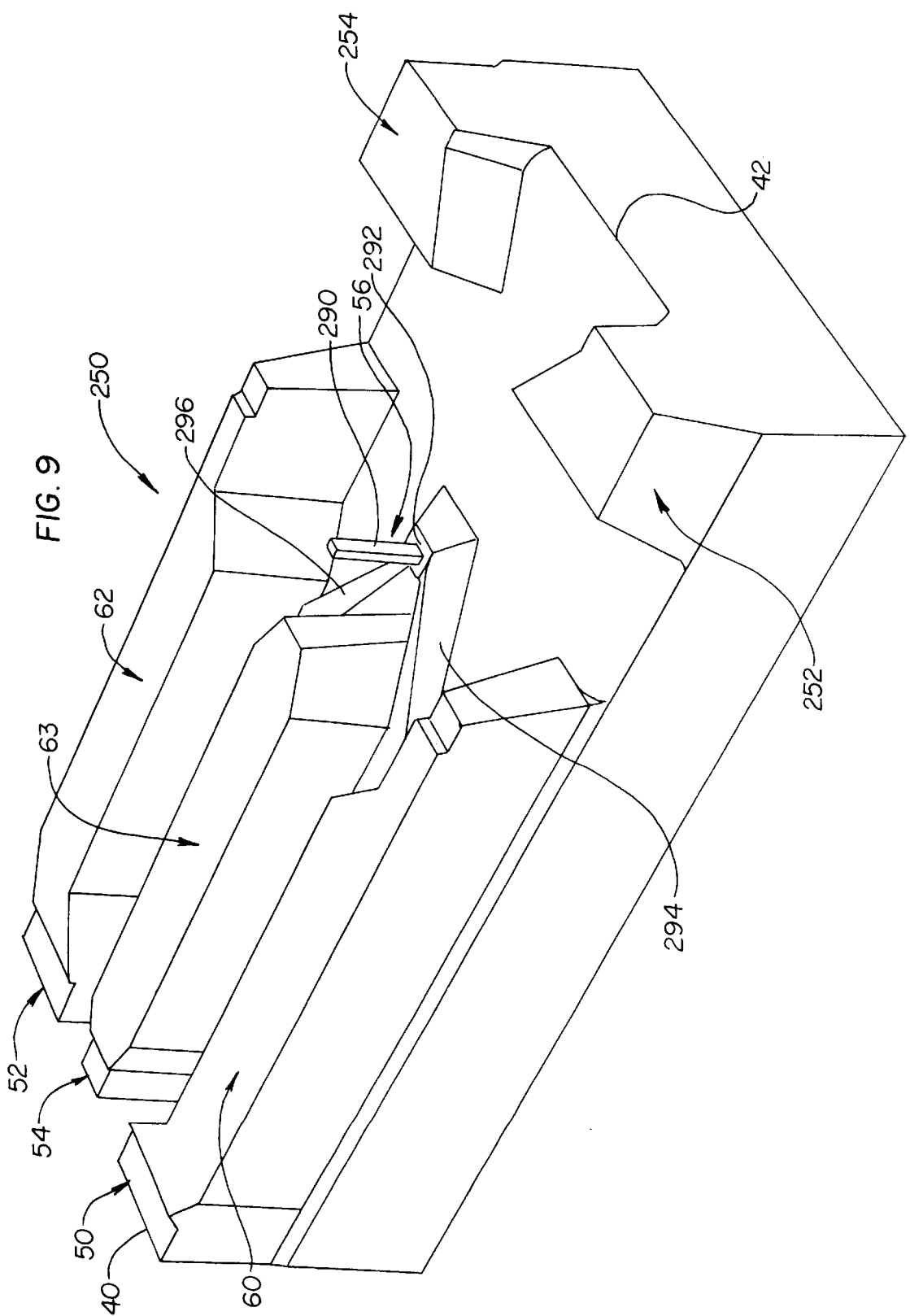
FIG. 9 is a perspective view of the slider shown in FIG. 8.

FIG. 8 is a plan view of an optical recording slider according to another embodiment of the present invention. FIG. 9 is a perspective view of the slider shown in FIG. 8. The dimensions of FIG. 9 are exaggerated in the vertical direction for illustration purposes. Slider 250 has similar elements as slider 200 shown in FIG. 6 and further includes raised, trailing end side pads 252 and 254. Pad 252 is positioned between side rail 50 and trailing edge 42. Pad 254 is positioned between side rail 52 and trailing edge 42. Pads 252 and 254 are both positioned rearward of optical head 56, relative to leading edge 40. Pads 252 and 254 are formed into the substrate material of slider 250 during the same fabrication steps used to form rails 50, 52 and 54.

Pads 252 and 254 increase pressure at trailing edge 42, which results in a higher lift force at the trailing edge. A high lift force at trailing edge 42 decreases pitch angle and increases flying height. The pitch angle decreases more at the disc OD than at the disc ID since pads 252 and 254 develop a higher positive pressure at the disc OD than at the disc ID. Positive pressure is proportional to the disc tangential velocity which is higher at the disc OD than at the disc ID. This results in a small pitch angle range (pitch angle range=OD pitch−ID pitch). A small pitch angle range results in a high pitch stiffness. The increase in positive pressure at the disc OD also results in a greater increase in flying height at the disc OD than at the disc ID. However, this increase is kept to an acceptable range. Another advantage of higher positive pressure at the trailing edge of the slider is that it prevents the trailing edge of the slider from being sucked into the ramp load arm in ramp load-unload applications.

Pads 252 and 254 each have a leading pad edge 260, a trailing pad edge 262, an inside pad edge 264 and an outside pad edge 266. Pads 252 and 254 form bearing surfaces 270 and 272 at trailing slider edge 42. Bearing surfaces 270 and 272 are substantially parallel to bearing surfaces 60, 62 and 63. However, it should be understood that bearing surfaces 60, 62, 63, 270 and 272 can include a crown or a cross curvature. Since slider 250 flies with a positive pitch relative to the disc surface, trailing pad edges 262 are the closest points on slider 250 to the disc surface rather than optical head 56. The lowest clearance of slider 250 relative to the disc surface can be increased (while maintaining or reducing the head clearance) by recessing bearing surfaces 270 and 272 from bearing surfaces 60, 62 and 63 by a selected depth, such as about 3.0 microns. The trailing edges of rails 50 and 52 can also be recessed by recessing trailing step surfaces 202 and 204 by a selected depth, such as about 1.0 microns. Other depths can also be used. This provides a higher mechanical clearance which improves wear and reliability.

Pads 252 and 254 are wider at leading pad edge 260 than at trailing pad edge 262. This reduces the increase in flying height at the disc OD by reducing the area of bearing surfaces 270 and 272 at trailing slider edge 42 while maintaining the benefits of increased pitch stiffness. In the embodiment shown in FIG. 8, inside edges 264 of pads 252 and 254 diverge from center line 48 along a portion of the length of pads 252 and 254, as measured from leading pad edge 260 toward trailing pad edge 262.

Optical head 56 is shown in greater detail in FIG. 9. Optical head 56 includes a MESA 290, an objective lens and a cap lens. The objective lens and the cap lens are carried within the body of slider 250 and are not shown. MESA 290 extends from the floor of slider 250 for optical communication with the surface of the disc. Coil 292 is wound around MESA 290 and is electrically coupled to conductive traces 294 and 296. Conductive traces 294 and 296 are applied to the floor of slider 250 for providing current to coil 292. In the embodiment shown in FIG. 9, conductive traces 294 and 296 extend forward from MESA 290 to about a midpoint along the length of slider 250 and then extend through the body of slider 250 to a pair of electrical contacts on the back surface of the slider.

Figure 10:
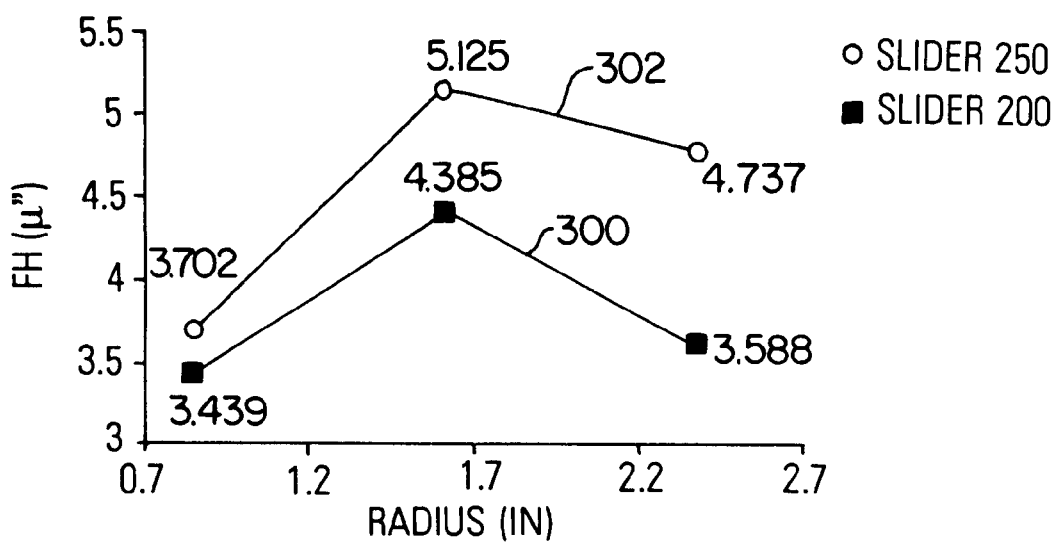
FIGS. 10 and 11 are graphs illustrating the results of a flying height comparison and a pitch angle comparison of the slider shown in FIG. 6 and the slider shown in FIGS. 8 and 9.

FIG. 10 is graph illustrating the results of a flying height comparison of the slider shown in FIG. 6 and the slider shown in FIGS. 8 and 9. The flying height in microinches is plotted as a function of the disc radius in inches. Line 300 represents the flying height of slider 200. Line 302 represents the flying height of slider 250. Slider 250 has a greater increase in flying height from the disc ID to the disc OD than slider 200. However, the increase is kept to an acceptable range, such as less than 2.0 microinches.

Figure 11:
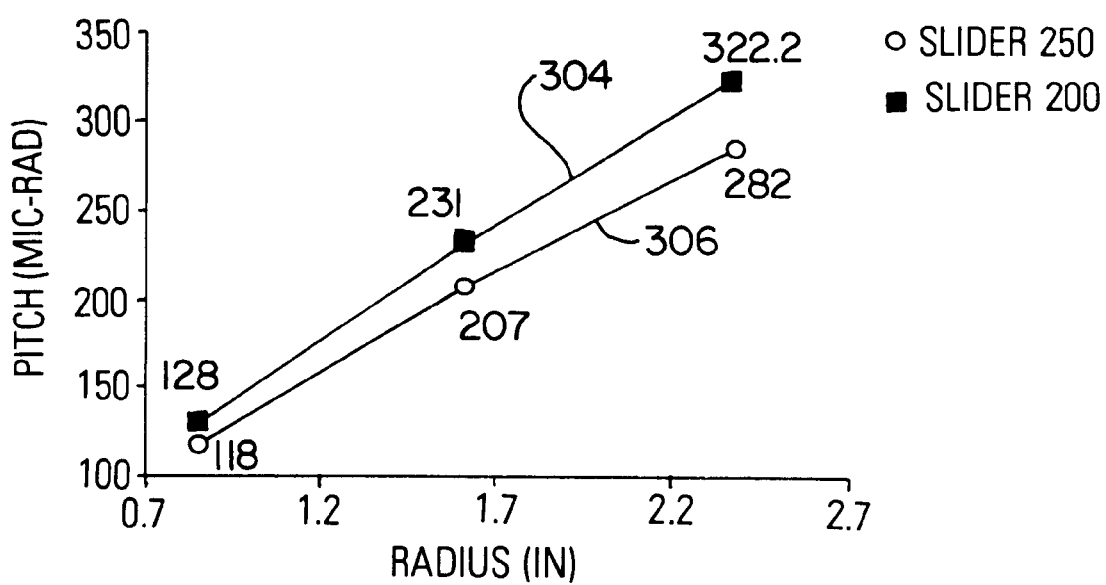

FIG. 11 is a graph illustrating the results of a pitch angle comparison between the slider shown in FIG. 6 and the slider shown in FIGS. 8 and 9. The pitch angle in microradians is plotted as a function of disc radius in inches. Line 304 represents the pitch angle of slider 200. Line 306 represents the pitch angle of slider 250. Application of trailing end side pads 252 and 254 on slider 250 relative to slider 200 reduced the pitch angle at the disc OD by about 12.3 percent and the pitch angle at the disc ID by about 7.8 percent. Slider 250 therefore has a smaller pitch angle range than slider 200, which results in a larger pitch stiffness.

FIG. 12 is a perspective view of an optical recording slider according to another alternative embodiment of the present invention. Again, the same reference numerals are used in FIG. 12 as were used in the previous figures for the same or similar elements. Slider 320 includes side rails 50 and 52, center rail 54, optical head 56 and trailing end side pads 322 and 324. Pads 322 and 324 separated from one another at trailing edge 42 and then angle toward one another between trailing edge 42 and optical head 56. Pads 322 and 324 are formed of a conductive material which is applied to the floor of slider 320 and are electrically coupled to coil 292. As in the embodiment shown in FIGS. 8 and 9, pads 322 and 324 form bearing surfaces which are recessed from bearing surfaces 60, 62 and 63 by about 3.0 microns, for example. In an alternative embodiment, pads 322 and 324 are formed of the slider substrate material. Conductive traces would then applied forward of optical head 56, similar to the embodiment shown in FIGS. 8 and 9.

The optical recording slider of the present invention provides a low suction force at the disc OD for ramp load-unload drive applications. The trailing end side pads provide a low pitch angle at the disc OD which results in higher mechanical clearance, better pitch stiffness and lower flying height sensitivity to altitude. These advantages are particularly useful for low disc speed and high flying height applications, such as a 5.25 inch optical disc drive.

Although the present invention has been described with reference to preferred embodiments, workers skilled in the art will recognize that changes may be made in form and detail without departing from the spirit and scope of the invention what

What is claimed is:

1. A disc head slider comprising:
   a slider body comprising a leading slider edge, a trailing slider edge and a center line extending from the leading slider edge to the trailing slider edge;
   a head carried by the slider body along the center line, forward of the trailing slider edge;
   first and second longitudinal side rails positioned on the slider body and having trailing rail edges terminating prior to the trailing slider edge;
   a third longitudinal rail positioned between the first and second longitudinal side rails and terminating forward of the head and of the trailing rail edges of the first and second longitudinal side rails;
   a first raised side pad positioned between the first longitudinal side rail and the trailing edge and rearward of the head; and
   a second raised side pad positioned between the second longitudinal side rail and the trailing edge and rearward of the head, the first and second raised side pads being discrete from the first, second and third longitudinal rails.

2. The disc head slider of claim 1 wherein the first and second raised side pads each comprise leading and trailing pad edges and are wider at the leading pad edge than at the trailing pad edge.

3. The disc head slider of claim 2 wherein the first and second raised side pads each further comprise inside and outside pad edges and a length measured from the leading pad edge to the trailing pad edge, and wherein the inside pad edges diverge from the center line along a portion of the length from the leading pad edge to the trailing pad edge.

4. The disc head slider of claim 1 wherein the first and second raised side pads each comprise a trailing pad edge, and wherein the first and second raised side pads are separated from one another at the trailing pad edges, angle toward one another between the trailing pad edge and the head, and meet one another substantially at the head.

5. The disc head slider of claim 4 wherein the slider body is formed of a slider substrate material, the first and second raised side pads are formed of a conductive material which is applied to the slider substrate material, and the first and second raised side pads are electrically coupled to the head.

6. The disc head slider of claim 1 wherein the slider body is formed of a slider substrate material and the first and second raised side pads are formed of the slider substrate material.

7. The disc head slider of claim 1 wherein the first and second longitudinal side rails form first and second bearing surfaces, respectively, the first and second raised side pads form third and fourth bearing surfaces, respectively, and the third and fourth bearing surfaces are parallel to and recessed from the first and second bearing surfaces.

8. The disc head slider of claim 7 wherein the first and second longitudinal side rails each comprise a recessed trailing surface which extends forward from the trailing rail edge and is parallel to and recessed from the first and second bearing surfaces.

9. The disc head slider of claim 1 wherein the head comprises an optical head.

10. The disc head slider of claim 1 wherein the third longitudinal rail comprises a leading section, a waist section and a trailing rail edge, wherein the leading section is rectangular and extends from the leading slider edge to the waist section and wherein the waist section widens from a first width at the rectangular leading section to a maximum width of the third rail and then narrows from the maximum width toward the trailing rail edge of the third longitudinal rail.

11. The disc head slider of claim 10 wherein the first and second longitudinal side rails each have a maximum rail width which is less than the maximum rail width of the third rail.

12. The disc head slider of claim 10 wherein:
    the first and second longitudinal side rails have a rail length measured from the leading slider edge toward the trailing slider edge; and
    the third longitudinal rail has the maximum rail width at a position along the center line corresponding to a midpoint along the rail length of the first and second longitudinal side rails.

13. The disc head slider of claim 12 wherein:
    the maximum rail width of the third longitudinal side rail is confined to a range along the center line corresponding to $\frac{1}{3}$ to $\frac{2}{3}$ the rail length of the first and second longitudinal side rails, as measured from the leading slider edge toward the trailing slider edge.

14. The disc head slider of claim 10 wherein the third longitudinal side rail further comprises:
    first and second lateral rail edges;
    wherein the first and second lateral rail edges extend parallel to the center line from the leading slider edge to the waist section; and
    wherein the first and second lateral rail edges diverge from the center line along a first transition section of the waist section, from the leading section to the maximum rail width, extend parallel to the center line from the first transition section to a second transition section of the waist section, and then converge toward the center line along the second transition section, from the maximum rail width toward the trailing rail edge of the third longitudinal rail.

15. The disc head slider of claim 14 wherein the third longitudinal side rail further comprises:

a rectangular trailing section extending from the second transition section to the trailing rail edge of the third longitudinal rail, along which the first and second lateral rail edges extend parallel to the center line.

16. The disc head slider of claim 10 wherein the first and second rails each comprise:

inside and outside rail edges;

a leading section, a waist section, a leg section which extends from the leading section to the waist section of the first and second rails, and a trailing section which extends from the waist section of the first and second rails to the trailing rail edge of the first and second rails;

a minimum rail width at the trailing rail edge of the first and second rails; and wherein the inside rail edges diverge from the center line along the trailing section of the first and second rails as the trailing section extends from the waist section of the first and second rails.

17. An optical recording slider comprising:

a slider body comprising a leading slider edge, a trailing slider edge and a center line extending from the leading slider edge to the trailing slider edge;

first and second longitudinal rails positioned on the slider body and each terminating prior to the trailing rail edge and comprising inside and outside rail edges, a leading section, a leg section, a waist section and a trailing section, wherein the inside and outside rail edges extend parallel to the center line along the leading section, from the leading slider edge to the leg section of the first and second rails, diverge from the center line along the leg section, from the leading section to the waist section of the first and second rails, and then extend parallel to the center line along the waist section, from the leg section to the trailing section of the first and second rails, and wherein the inside rail edges diverge from the center line along the trailing section, from the waist section toward the trailing rail edges of the first and second rails;

a third longitudinal rail positioned along the center line, between the first and second longitudinal rails, terminating prior to the trailing rail edges of the first and second rails, and comprising first and second lateral rail edge, a trailing rail edge, a leading section, a waist section and a maximum rail width, wherein the lateral side edges extend parallel to the center line along the leading section, from the leading slider edge to the waist section of the third rail, diverge from the center nline along the waist section, from the leading section of the third rail to a portion of the third rail having the maximum rail width, extend parallel to the center line along the portion having the maximum rail width and then converge toward the center line from the portion having the maximum rail width toward the trailing rail edge of the third rail;

an optical head positioned along the center line, between the trailing rail edge of the third rail and the trailing slider edge;

a first raised side pad positioned between the first rail and the trailing edge and rearward of the optical head; and a second raised side pad positioned between the second rail and the trailing edge and rearward of the head, the first and second raised side pads being discrete from the first, second and third longitudinal rails.

18. An optical disc drive comprising:

a housing;

a spindle motor;

a disc rotatably coupled to the spindle motor;

an actuator assembly mounted to the housing; and an optical recording slider carried by the actuator assembly for communication with the disc, the slider comprising:

a slider body comprising a leading slider edge, a trailing slider edge and a center line extending from the leading slider edge to the trailing slider edge;

an optical head carried by the slider body along the center line, forward of the trailing slider edge;

first, second and third longitudinal rail means positioned on the slider body and shaped for generating air expansion regions adjacent the optical head;

a first raised side pad positioned between the first longitudinal side rail and the trailing slider edge and rearward of the head; and a second raised side pad positioned between the second longitudinal side rail and the trailing slider edge and rearward of the head, the first and second raised side pads being discrete from the first, second and third longitudinal rails.

* * * * *